United States Patent
Aldred

(10) Patent No.: US 7,456,740 B2
(45) Date of Patent: Nov. 25, 2008

(54) DETECTOR DEVICE

(75) Inventor: Ian Richard Aldred, Rickmansworth Herts (GB)

(73) Assignee: Microwave Solutions Limited, Borehamhood Herts (GB)

( * ) Notice: Subject to any disclaimer, the term of this patent is extended or adjusted under 35 U.S.C. 154(b) by 0 days.

(21) Appl. No.: 11/774,166

(22) Filed: Jul. 6, 2007

(65) Prior Publication Data

US 2007/0279102 A1 Dec. 6, 2007

Related U.S. Application Data

(62) Division of application No. 10/039,280, filed on Jan. 2, 2002, now Pat. No. 7,256,693.

(51) Int. Cl.
*G08B 13/18* (2006.01)
(52) U.S. Cl. .................... 340/552; 340/545.3; 340/567; 340/825.7; 455/302; 455/307; 455/296; 455/63.1; 455/67.13; 342/89; 342/99; 342/114
(58) Field of Classification Search ... 340/309.8–309.9, 340/540–565, 567, 825.7; 455/302, 307, 455/296, 63.1, 67.11, 67.13, 209; 342/89, 342/99, 114
See application file for complete search history.

(56) References Cited

U.S. PATENT DOCUMENTS

| 3,801,978 | A | * | 4/1974 | Gershberg et al. | 340/516 |
|---|---|---|---|---|---|
| 3,939,424 | A | * | 2/1976 | Shimizu et al. | 455/265 |
| 3,967,283 | A | | 6/1976 | Clark et al. | 342/28 |
| 4,225,851 | A | * | 9/1980 | Reschovsky et al. | 340/870.04 |
| 4,382,291 | A | | 5/1983 | Nakauchi | 367/93 |
| 4,468,795 | A | * | 8/1984 | Gerig | 377/6 |
| 4,647,913 | A | * | 3/1987 | Pantus | 340/506 |
| 4,660,024 | A | | 4/1987 | McMaster | 340/522 |
| 4,719,421 | A | * | 1/1988 | Kerr | 324/233 |
| 5,131,748 | A | | 7/1992 | Monchalin et al. | 356/486 |
| 5,504,473 | A | | 4/1996 | Cecic et al. | 340/541 |
| 5,519,317 | A | | 5/1996 | Guichard et al. | 324/236 |
| 5,581,236 | A | | 12/1996 | Hoseit et al. | 340/511 |
| 5,630,225 | A | * | 5/1997 | Corman | 455/302 |
| 5,936,524 | A | | 8/1999 | Zhevelev et al. | 340/552 |
| 6,023,205 | A | | 2/2000 | Huang et al. | 333/202 |
| 6,087,972 | A | * | 7/2000 | Puglia et al. | 342/28 |
| 6,317,589 | B1 | * | 11/2001 | Nash | 455/245.2 |
| 6,452,482 | B1 | | 9/2002 | Cern | 375/258 |

\* cited by examiner

*Primary Examiner*—George A Bugg
*Assistant Examiner*—Son M Tang
(74) *Attorney, Agent, or Firm*—Occhiuti Rohlicek & Tsao LLP

(57) ABSTRACT

The present invention relates to a detector device and, more particularly, to a detector device comprising a self-diagnosis means for monitoring the correct performance or otherwise of the device. During testing, the device, which normally operates using the Doppler shift principle, is arranged to influence the phase and/or amplitude of the received signal in response to an applied test signal. The received signal may be a Doppler shifted version of a transmitted signal. Combining the phase and/or amplitude shifted version of the received signal and the signal from the local oscillator produces an IF signal that is indicative of the phase and/or amplitude shift. If the device is operating correctly, that signal should have a predetermined range of characteristics. If the self-diagnosis means determines that the produced signal falls outside of the predetermined range of characteristics, an alarm is raised to alert, for example, maintenance personnel to the problem.

10 Claims, 2 Drawing Sheets

DETECTOR DEVICE

CROSS-REFERENCE TO RELATED APPLICATIONS

This application is being filed as a divisional of application Ser. No. 10/039,280, filed on Jan. 2, 2002, which claims the benefit of Great Britain Application No. 0130324.7, filed Dec. 19, 2001. The contents of both applications are hereby incorporated by reference in their entirety.

FIELD OF THE INVENTION

The present invention relates to a detector device and, more particularly, to such a device comprising a self-diagnosis capability.

BACKGROUND TO THE INVENTION

Present day motion detector devices rely upon the Doppler principle, as is well known within the art, to detect the presence of a moving object within a protected volume or volume to be surveyed. Conventionally, such motion detector devices use at least microwave technology, that is, typically X-band or K-Band signals transmitted and received via a transceiver. Post-reception, the received signals are suitably processed to identify the presence of a Doppler signal that can be attributed to movement within the protected volume.

Relatively sensitive devices such as, for example, the mixer, which typically takes the form of a mixer diode, can be easily damaged by inappropriate handling or excessive signal strengths. Therefore, care needs to be taken in the fabrication and the installation of the motion detector devices. Notwithstanding any such care, the mixer diodes may, post-installation, be inappropriately exposed to signals or handling that may cause damage. It will be appreciated that any such damage may, in the worst case, prevent the motion detector device from operating correctly in that, from the perspective of the output of the mixer diode, there will be no change in the signal due to any Doppler shifted received signal. Alternatively, the performance of the mixer diode may be degraded in some way so that it produces excessive noise which reduces the sensitivity of the motion detector device.

It is an object of the present invention at least to mitigate some of the problems of the prior art.

SUMMARY OF INVENTION

Accordingly, a first aspect of the present invention provides a detector device comprising at least a field-distortor, responsive to an input signal, for influencing at least one characteristic of a first electro-magnetic signal carried by a first conductor; and a mixer for combining at least the influenced first electro-magnetic signal (the RF signal) with a second signal (the local oscillator signal), to produce a combined signal (IF signal) having a characteristic determined by the input signal.

In a preferred embodiment, the field-distortor for influencing at least one characteristic of the first electro-magnetic signal is operable to vary at least the phase and preferably the phase and magnitude of the first electro-magnetic signal when that first signal is carried by the conductor.

Preferably, an embodiment is provided in which the field distortor comprises a semi-conductor device disposed adjacent to the conductor carrying the first signal. It will be appreciated that the semi-conductor device should be positioned sufficiently close to the conductor so as to be able to influence the electro-magnetic field of the first signal being carried by the conductor.

In a preferred embodiment, the degree of influence exerted by the field distortor varies with variations in the applied signal. Preferably, the applied signal is modulated at a predetermined frequency. The predetermined frequency is preferably between 10 Hz and 80 Hz, these being typical Doppler frequencies that would be generated by a human moving within a protected volume. Additionally, the applied signal is arranged to switch the field distortor between substantially open and substantially closed circuit conditions.

In preferred embodiments, the field distortor does not radiate or generate an electro-magnetic field in response to the input signal.

In a preferred embodiment the semi-conductor device is a diode.

It will be appreciated that the output of the mixer, having had one of the input signals influenced by the field distortor, can be used by a signal analysis system comprising, for example, a micro-processor and associated software, to determined whether or not the mixer and/or the device as a whole is functioning correctly. Suitably, an embodiment additionally comprises a signal analyser for analysing the combined signal to determine whether that combined signal has predetermined characteristics. In preferred embodiments the predetermined characteristics include at least an oscillation having a frequency that is associated with the frequency of the input signal.

To test the operation of the mixer an appropriate input signal should be applied to the field distortor. Suitably, an embodiment provides a signal generator for generating the input signal to be applied to the field distortor for influencing the electro-magnetic field.

It will be appreciated that the second signal fed into the mixer is conventionally a divided portion of the output of a local oscillator; the other portion having been, in operation, radiated by a transmit antenna. In the absence of motion, the RF signal on the input to the mixer is at the same frequency as the LO signal. The mixer then operates as a phase detector and produces a DC voltage at its output that is related to the phase difference between the LO and RF signal and the magnitude of the RF signal. Hence, by disturbing at least the phase and, preferably, the phase and magnitude of the RF input signal to the mixer, an output signal indicative of that disturbance will be produced by the mixer.

BRIEF DESCRIPTION OF THE DRAWINGS

Embodiments of the present invention will now be described, by way of example only, with reference to the accompanying drawings in which.

DESCRIPTION OF THE PREFERRED EMBODIMENTS

Figure 1:
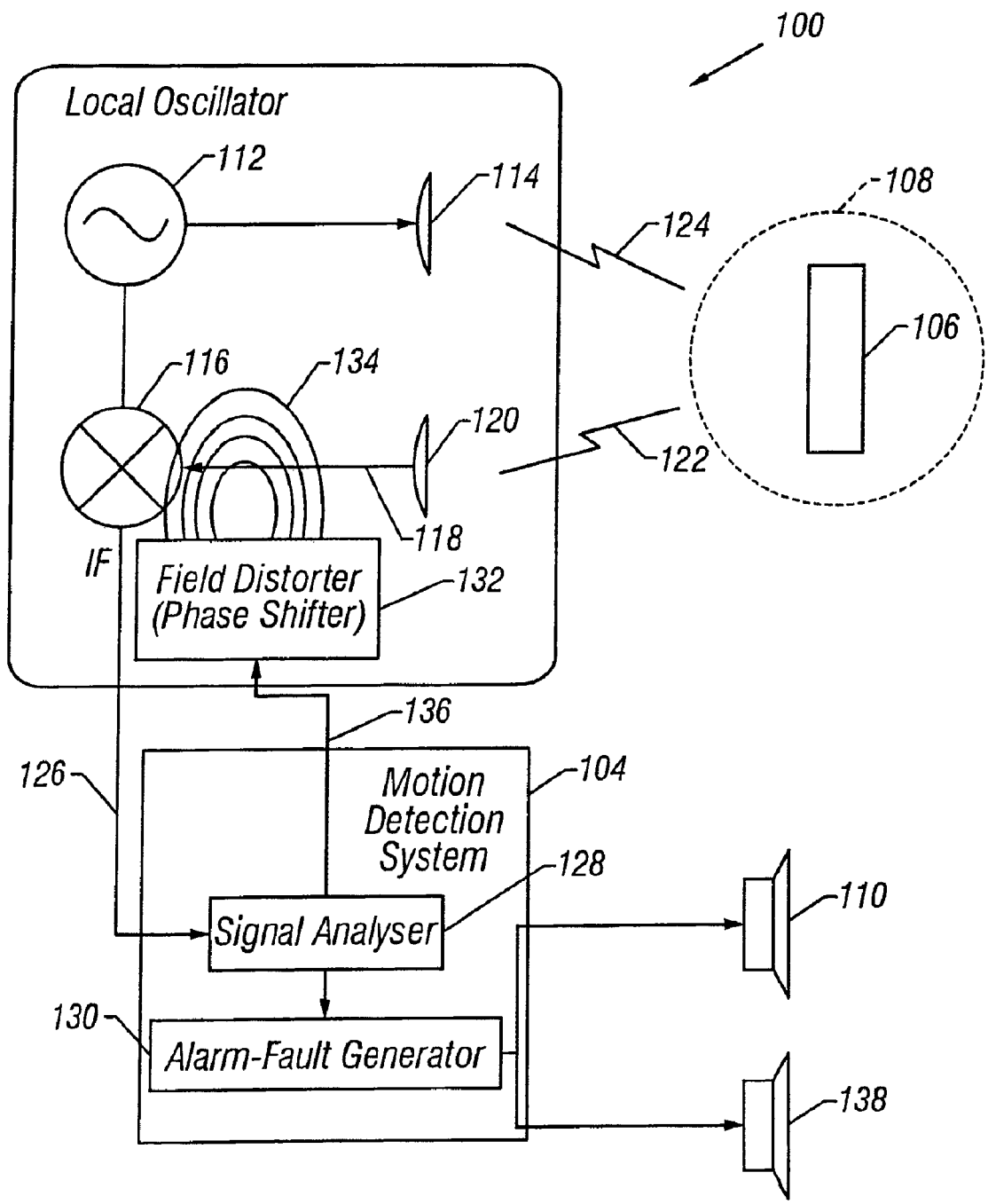
FIG. 1 illustrates schematically a motion detection system having a self-diagnosis capability in accordance with a first embodiment of the present invention.

Referring to FIG. 1 there is shown schematically a motion detection system 100 comprising a detector device 102 which co-operates with a detection system 104 to detect relative motion between the device and a body 106 within a monitored volume 108 and to produce a corresponding alarm signal via an output device 110 in response to the detection of any such relative motion. The output device maybe an audio-visual output device.

The detector device 102 comprises a local oscillator 112 for generating K or X-band microwave signals that are radiated into the monitored or protected volume 108 via a transmit antenna 114. A portion of the output of the local oscillator signal 112 is directed towards a mixer 116 which combines that portion with an RF input signal 122, carried on a conductor 118, that has been received by a receive antenna 120. Typically, in the presence of relative motion between the device and the body, the RF input signal 122 is a reflected and Doppler shifted version of the transmitted signal 124. The output of the mixer, that is, the IF signal 126, is input into the detection system 104 which, if appropriate, can instruct an alarm-fault generator 130 to generate an appropriate alarm signal to be output via the audio-visual output device 110.

The detector device also comprises a field distortor 132 for influencing the electro-magnetic field of the RF input signal being carried by the conductor 118. Preferably, the field distortor 132 takes the form of a diode that, in response to an applied signal 136, causes a change in the electro-magnetic field carried by the conductor. In particular, the field distortor influences the phase of the RF input signal (at the RF input port) of the mixer 116.

In the absence of motion, the mixer 116 acts as a phase (detector) and produces a DC output signal in response to receiving an input signal on the port that would ordinarily receive the received signal 122, that is, on the RF input port of the mixer. This input signal is a combination of the received signal 122 reflected from static objects within the protected volume 108 and signals generated within the detector device 102 due to internal reflections.

Figure 2:
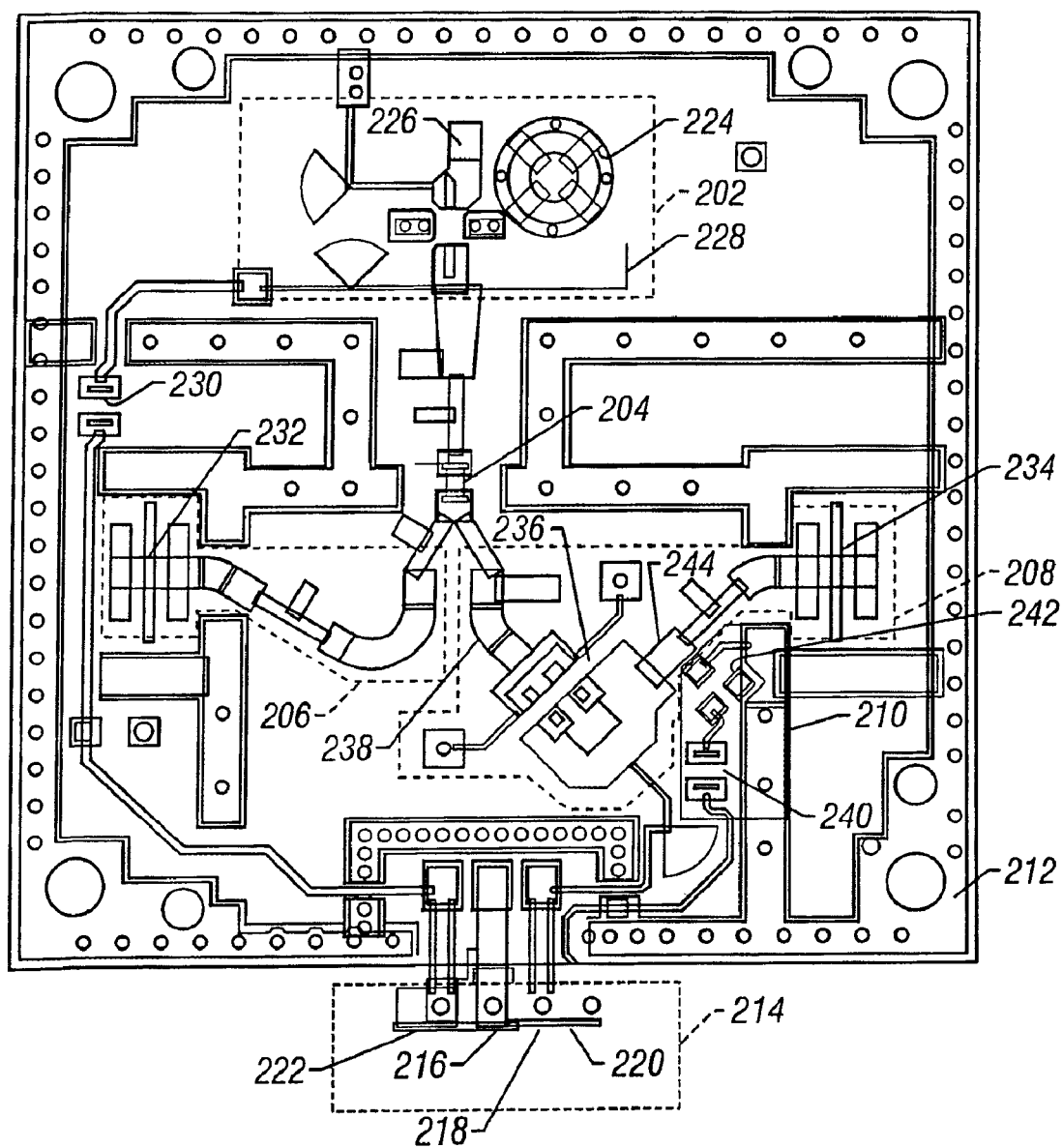
FIG. 2 illustrates a detector device for use in such a motion detection system in accordance with an embodiment of the present invention.

Referring to FIG. 2 there is shown in greater detail a circuit 200 for realising an embodiment of the detector device 102 according to the present invention. The circuit 200 comprises a local oscillator circuit 202, that is coupled, via a decoupling capacitor 204 to a transmit antenna feed portion 206 and a receive antenna portion 208 of the circuit. The device also comprises a test portion 210. The various portions 202 to 210 are screened via appropriate planar metalisations 212 having holes drilled therein to suppress unwanted spurious electromagnetic emissions from the various circuit elements.

A series of connection tabs 214 are provided to allow power to be supplied to the circuit elements 202 to 210 and to allow the IF signal to be received as well as to allow a test signal to be applied to the test portion 210. The connection tabs 214 comprise a ground connection tab 216 and an IF output connection tab 218. The IF output connection tab 218 also serves as the output for the signal generated as a result of testing the operation of the receive portion 208. It will be appreciated that the test diode 242 tests the whole of the operation of the detector, that is, the local oscillator, the mixer and the transmit and receive antennas. A test signal connection tab 220 is arranged to provide the test signal to the test portion 210 of the device. Power is supplied to the local oscillator circuit 202 via a power connection tab 222.

The local oscillator circuit 202 comprises, in a preferred embodiment, a dielectric puck 224 disposed adjacent to a pair of strip lines 226 and 228 that are connected to one another via the gate and drain of a FET transistor. Power is supplied to the transistor via the power connection tab 222 and a resistor 230. The output of the transistor is coupled via the decoupling capacitor 204 to the transmit and receive portions 206 and 208 where that power is divided in a predetermined ratio. The power carried by a microstrip line 232 of the transmit portion 206 is coupled via a slot in a ground plane (not shown), preferably, to a pair of patch transmit antennas (not shown) as is well known within the art. An example of a detector device within which the present invention can be incorporated is shown in UK patent application no. GB2253108, the content of which is incorporated herein for all purposes.

Similarly, power is coupled to a microstrip line 234 of the receive portion via a corresponding slot in a ground plane (not shown) and an associated pair of patch receive antennas (not shown).

It can be appreciated that the diode mixer 236 of the receive portion 208 receives power from the local oscillator via a corresponding microstrip line 238 and also from the microstrip line 234. The output of the mixer diode 236 is fed to the IF output tab 218 for further processing by the detection system 104 and, more particularly, by a signal analyser 128.

The test portion 210, in a preferred embodiment, comprises the series arrangement of a resistor 240 and the test diode 242. The diode 242 is disposed within close proximity to a conductor or microstrip line 244 which couples power from the receive microstrip line 234 to the receive RF input of the diode mixer 236. The diode 242 is positioned sufficiently close to the microstrip line conductor 244 such that, in the presence of the signal applied to the test signal connection tab 220, the variation in diode 242 characteristics is sufficient to vary the degree of influence experienced by the electro-magnetic field of the signal being coupled from the receive microstrip line 234 to the receive RF input of the diode mixer 236 in the vicinity of microstrip line 244. In a preferred embodiment, the electro-magnetic field perturbation caused by the change in diode characteristics in response to the applied signal imparts at least a phase change to the signal carried by the microstrip line 244. As the microstrip line 244 couples power to the RF port of the mixer, that is, the receive RF input of the diode mixer 236, a corresponding phase change occurs at the RF port of the mixer.

It will be appreciated in the absence of motion, that is, in the absence of the received signal being a Doppler shifted version of the transmitted signal, that the mixer diode 236 operates as a phase detector which generates a DC voltage that is dependent upon the relative phases and magnitudes of the signals present at the local oscillator input port and the RF input port of the mixer. The two signals are in fact each the resultant of a vector summation of all signals appearing at each of the two ports. Therefore by influencing one of those signals, as in the preferred embodiment, the phase of the resultant signal at the RF input port can be changed. In turn this will change the DC voltage present on the IF output tab 218.

Preferably, the test signal applied to the test signal connection tab 220 is arranged to be a TTL signal (0V to +5V) at a frequency that is within the bandwidth of the amplifiers contained within the signal analyser 128 that is connected to the IF output tab 218. For example, embodiments may use a test signal having a frequency of 30 Hz.

The detection system 104 uses the signal analyser 128 to monitor the IF output 218 to determine whether or not an intrusion into the protected volume 108 has been detected during conventional operation of the system 100. In the event that the signal analyser 128 determines that an intrusion into the protected volume 108 has been detected, the signal analyser 128 instructs the alarm-fault signal generator 130 to produce at least one of an audible or visual alarm signal via the output device 110 or to output an alarm condition signal for further processing by, for example, a central control centre.

However, during a test mode of operation of the detection system, the signal analyser 128 supplies an appropriate test signal to the test signal connection tab 220 during the normal operation of the detector device 102, that is, during the conventional transmit and receive operations of the detector device 102. The signal analyser 128, again, monitors the IF output tab 218 and in the absence of the IF output signal meeting predetermined criteria, the signal analyser 128 instructs the alarm-fault generator 130 to produce a fault indication signal that is output via a fault indicator 138. It will be appreciated that the testing preferably takes place in the absence of motion of a body within the protected volume. The predetermined criteria include the magnitude of the IF signal being disposed above or below a particular threshold. The fault indication signal can equally well or additionally be output to a central control centre.

Advantageously, the correct operation or otherwise of the detector device 102 can be monitored in a predetermined and controlled manner and also in the absence of external test equipment that is conventionally used to monitor such operation.

It will be appreciated that a conventional diode, such as a BAS 16, can be used in the preferred embodiments. However, the embodiments are not restricted to such an arrangement. Embodiments can equally well be realised in which other devices could be used such as, for example, a microwave diode, a FET, a further mixer or the like, providing the characteristics of the device vary in response to an applied test signal in such a manner as to influence the electro-magnetic field carried by the microstrip lines to the RF input of the mixer.

Although the above embodiments have been described with reference to detecting movement within a protected volume, the present invention is not limited to such an application. It will be appreciated by those skilled in the art that the invention is equally applicable to relative motion between the detector device and a body whether the body is stationary and the detector is moving or both the body and detector are moving relative to each other.

The above embodiments have been described with reference to a field distortor that influences or modifies the electro-magnetic field passing through it. It does not radiate electro-magnetic energy as a microwave oscillator would for example, at least not intentionally or not to a sufficient degree to influence the field carried by the conductor. However, it will be appreciated that embodiments of the present invention can be realised in which the field distortor does radiate an electro-magnetic field, in response to an input signal or otherwise, which influences the signal or electro-magnetic field present at the RF input port of the mixer. The field present at that port will be generated by superposition of the generated field and the received RF field. This superposition may be in addition to the influencing of the field described above in the preferred embodiments.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A detector device for detecting an object in a detecting zone by emitting an electromagnetic signal using a generated signal into the detecting zone and receiving an electromagnetic signal therefrom through a first conductor, the detector device comprising:
    a second conductor for carrying a portion of the generated signal;
    a field-distorter comprising a semi-conductor device disposed adjacent to one of the first conductor and the second conductor, the field distorter being responsive to an input signal to shift a phase of the electro-magnetic signal conducted in the one of the first conductor and the second conductor to produce a phase shifted signal in the conductor; and
    a phase-comparator configured to receive and mix signals of the first and second conductors and to produce a combined signal having a characteristic determined by the input signal, the combined signal indicative of the correct operation or otherwise of the detector device,
    wherein the characteristic of the combined signal corresponds to a change in a dc voltage component of the combined signal; the change being responsive to the input signal.

2. The device of claim 1, wherein the phase comparator is a mixer.

3. The device of claim 1, further comprising:
    a transceiver including:
        a transmit antenna for transmitting at least one of the plurality of electro-magnetic signals for detecting an object in a detecting zone; and
        a receive antenna for receiving a received signal being derived from the at least one of the plurality of electro-magnetic signals transmitted by the transmit antenna and being indicative of the detecting of the object in the detecting zone.

4. The device of claim 1, further comprising:
    an oscillator for generating at least one of the plurality of electro-magnetic signals.

5. The device of claim 1, further comprising:
    a signal analyzer for monitoring the characteristic of the combined signal to determine the correct operation or otherwise of at least one element of the device.

6. The device of claim 1, wherein the at least one element is at least one of a phase comparator, mixer, oscillator, and antenna.

7. The device of claim 1, wherein the field-distorter further comprises:
    a semiconductor.

8. The device of claim 1, further comprising:
    a signal generator for generating the input signal.

9. The device of claim 1, wherein the field-distorter is configured to not generate an electro-magnetic field in response to receiving the input signal.

10. The device of claim 1, wherein the field-distorter is configured to generate an electro-magnetic field in response to receiving the input signal.

* * * * *